United States Patent [19]

Strickland

[11] Patent Number: 4,470,371
[45] Date of Patent: Sep. 11, 1984

[54] ANIMAL WATERING MEANS

[76] Inventor: George B. Strickland, 3535 Sturbridge Dr., Hope Mills, N.C. 28348

[21] Appl. No.: 383,335

[22] Filed: May 28, 1982

Related U.S. Application Data

[63] Continuation-in-part of Ser. No. 184,944, Sep. 8, 1980, abandoned.

[51] Int. Cl.³ ................................................ A01K 7/04
[52] U.S. Cl. ...................................... 119/78; 137/414
[58] Field of Search ........................ 119/61, 72, 74, 78, 119/79, 80; 248/151, 156, 532; 137/414

[56] References Cited

U.S. PATENT DOCUMENTS

| | | | |
|---|---|---|---|
| 649,436 | 5/1900 | Cooper | 119/79 |
| 1,432,051 | 10/1922 | Burrell | 119/61 |
| 2,542,400 | 2/1951 | Donofrio | 119/61 X |
| 3,145,728 | 8/1964 | Sterrett et al. | 137/414 |
| 3,242,940 | 3/1966 | Sirotek | 137/414 X |
| 3,570,795 | 3/1971 | Benzel | 248/156 X |
| 4,138,967 | 2/1979 | Tamborrino | 119/78 |

FOREIGN PATENT DOCUMENTS

| | | | |
|---|---|---|---|
| 645013 | 10/1950 | United Kingdom | 137/414 |
| 843935 | 8/1960 | United Kingdom | 137/414 |

Primary Examiner—Robert P. Swiatek
Attorney, Agent, or Firm—Berman, Aisenberg & Platt

[57] ABSTRACT

This invention is a watering device particularly adapted for use by animals. A valve is provided for maintaining the liquid level within the reservoir and the entire device is so designed that it cannot be accidentally upset by the animal. A valve having a pressure chamber to control a diaphragm permits the watering device to be compact.

8 Claims, 6 Drawing Figures

4,470,371

ANIMAL WATERING MEANS

This application is a continuation-in-part of application Ser. No. 184,944, filed Sept. 8, 1980, now abandoned.

FIELD OF INVENTION

This invention relates to animal husbandry and more particularly to animal watering devices.

BACKGROUND OF INVENTION

Since man first began keeping animals in confining enclosures, problems have been enountered in assuring that adequate water is available. Troughs have been used in conjunction with livestock, and in more recent times, various float valve systems have been devised to maintain a constant water level in such troughs. These systems have generally been elaborate, permanent installations that are relatively expensive to install and maintain.

For smaller enclosures for one or two animals such as dog pens where relatively small amounts of water are consumed, a permanent watering system cannot be economically justified. Thus, the old-fashioned method of placing a bowl of water in the pen, which is periodically refilled, is today the method almost universally used for watering dogs and similar animals. The major drawback of this method, of course, is that the water must be checked at least every other day and should be inspected daily in case the animal has turned the bowl over. This requirement for confined care is not only time consuming but is confining to the owner or attendant.

BRIEF DESCRIPTION OF INVENTION

After much research and study into the above-mentioned problems, the present invention has been developed to provide a relatively inexpensive and yet highly efficient animal watering system which maintains a constant level during use, cannot be accidentally turned over or otherwise shifted by the animal, and yet is readily portable.

The above advantages are provided by a molded plastic container, which is flared outwardly toward the bottom, having removable retaining spikes or anchors inserted in the bottom portion. The liquid level float valve is within a cavity and is thus well protected, and is readily accessible. The water line leading to the valve is readily connected and disconnected.

A new valve operates by allowing the pressure of the water to close the valve. This permits a shorter float arm which in turn allows the use of a smaller chamber.

In view of the above, it is an object of the present invention to provide a relatively inexpensive and yet highly efficient animal watering device.

Another object of the present invention is to provide a constant-level animal watering system which is inexpensive to manufacture and yet is highly efficient in use.

Another object of the present invention is to provide a portable animal watering system which resists being turned over or moved by an animal.

Another object of the present invention is to provide an animal watering system which can be readily connected to a common garden hose.

Another object of the present invention is to provide removable retaining spikes in the bottom portion of an animal watering means to prevent the animal from inadvertently moving the watering device.

Another object of the present invention is to provide an improved, readily portable animal watering system which protects the valve mechanism and yet has provision for ready access to the value.

A further object of the present invention is to provide a valve which is particularly useful for an animal watering system.

Other objects and advantages of the present invention will become apparent and obvious from a study of the following description and the accompanying drawings which are merely illustrative of such invention.

DETAILED DESCRIPTION OF INVENTION

With further reference to the drawings, the watering system of the present invention includes a reservoir container indicated generally at 10. This container includes a reservoir area 11 bounded by sides 12 and bottom 13. A downwardly and outwardly tapered apron or skirt 14 is included and the entire reservoir container is preferably integrally molded in one piece.

Figure 1:
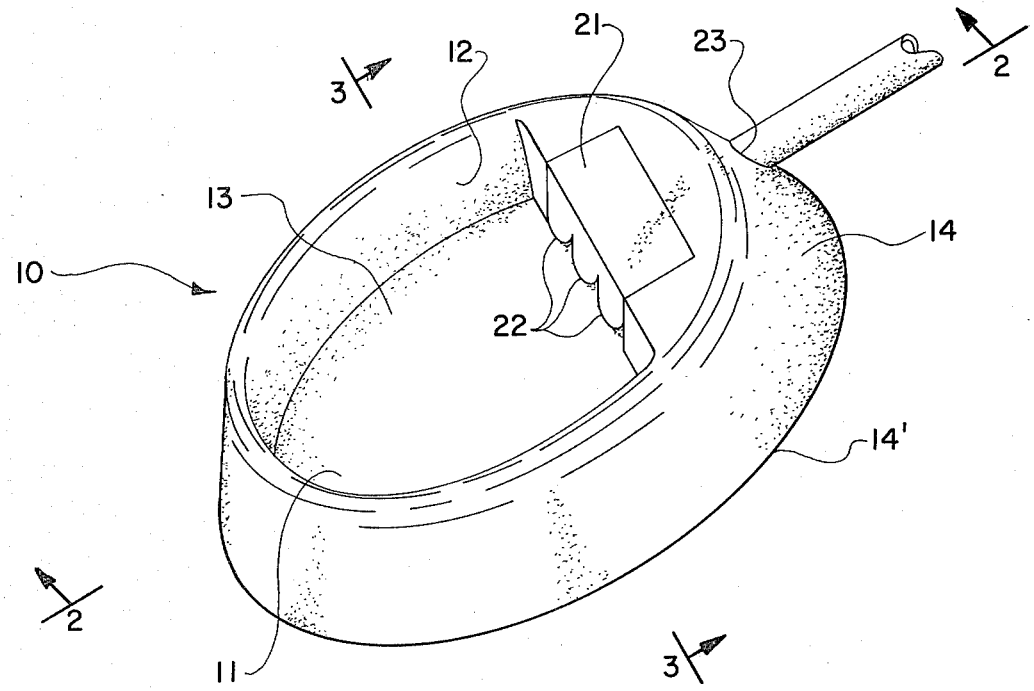
FIG. 1 is a top perspective view of the improved watering system of the present invention.
Figure 2:
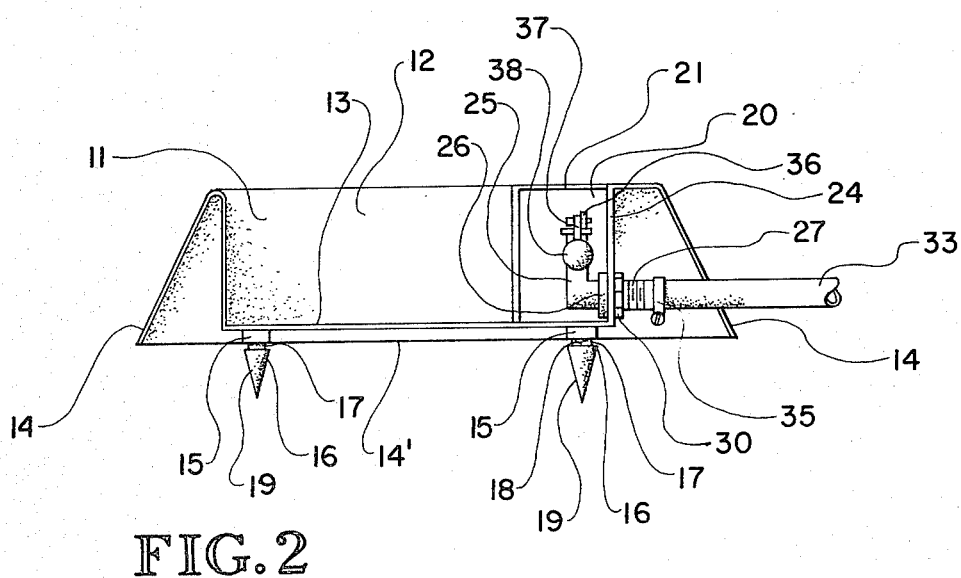
FIG. 2 is a sectional view taken through line 2—2 of FIG. 1.
Figure 3A:
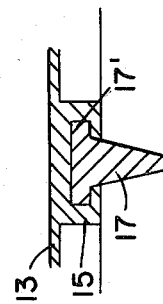
FIG. 3A is a cross-section of a preferred form of a support leg, taken along line 2—2 of FIG. 1.
Figure 3:
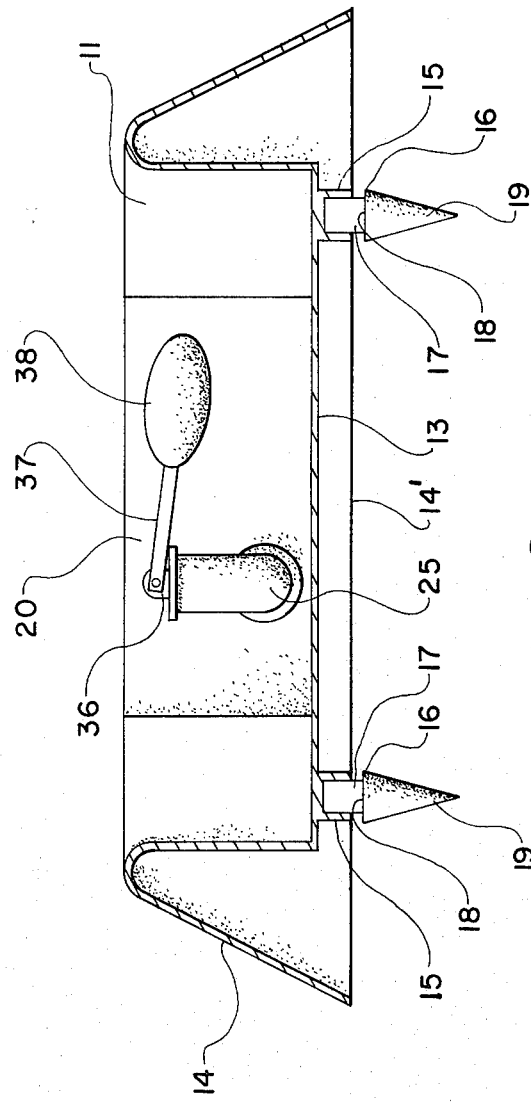
FIG. 3 is a sectional view taken through line 3—3 of FIG. 1 with the access cover being removed for clarity.

An can clearly be seen in the cross-sectional views of FIGS. 2 and 3, the bottom 13 of the reservoir container is slightly above the bottom or lower edge 14' of the outer skirt 14. Skirt 14 may have a reinforcing band at its lower edge 14', for allowing thin materials to be used while providing a sturdy device.

Leg receiving sockets 15 are formed on the lower portion of bottom 13. These sockets are preferably integrally molded with the bottom. The bottom edges of leg sockets 15 lie in the plane of the bottom edge 14' of outer skirt 14 as can clearly be seen in FIGS. 2 and 3. When the watering system is used without legs, leg sockets 15 will act as additional support for the bottom of the reservoir container since they lie in the plane of the bottom 14' of skirt 14. When conical anchoring legs 16 are used with the container 10, the bottom will be supported by the legs.

Anchoring legs 16 are provided with a shaft portion 17 which compreses a locking tip being adapted to be grippingly inserted in to sockets 15 and locked or snapped into position. The shoulder portion 18 of the tapered conical tips 19 of each of the anchor legs 16 acts as a retainer so that such legs can be easily pushed into the ground and yet will be difficult to remove therefrom.

FIG. 3A shows a preferred form of the conical support legs. Socket 15 has grooves for receiving ears 17' on the upper end of conical shaft 17. This embodiment is particulary useful because the shaft can be of moulded plastic and is sturdy. The shaft 17 is easily locked in socket 15 by inserting ears 17' into notches in the groove and then rotating the shaft to lock the ears in the groove.

A valve cavity 20 is provided in one end of reservoir container 10 and is adapted to be enclosed by removable access cover 21. This cover is preferably scalloped as indicated at 22 along its lower portion to allow fluid dispensed within the valve cavity 20 to readily enter the reservoir area 11.

An opening 23 is provided through skirt 14 in the area adjacent to and slightly to one side of the end of container 10 having valve cavity 20 formed therein. A second opening in axial alignment with opening 23 is provided in the rear wall portion 24 of cavity 20.

Figure 4:
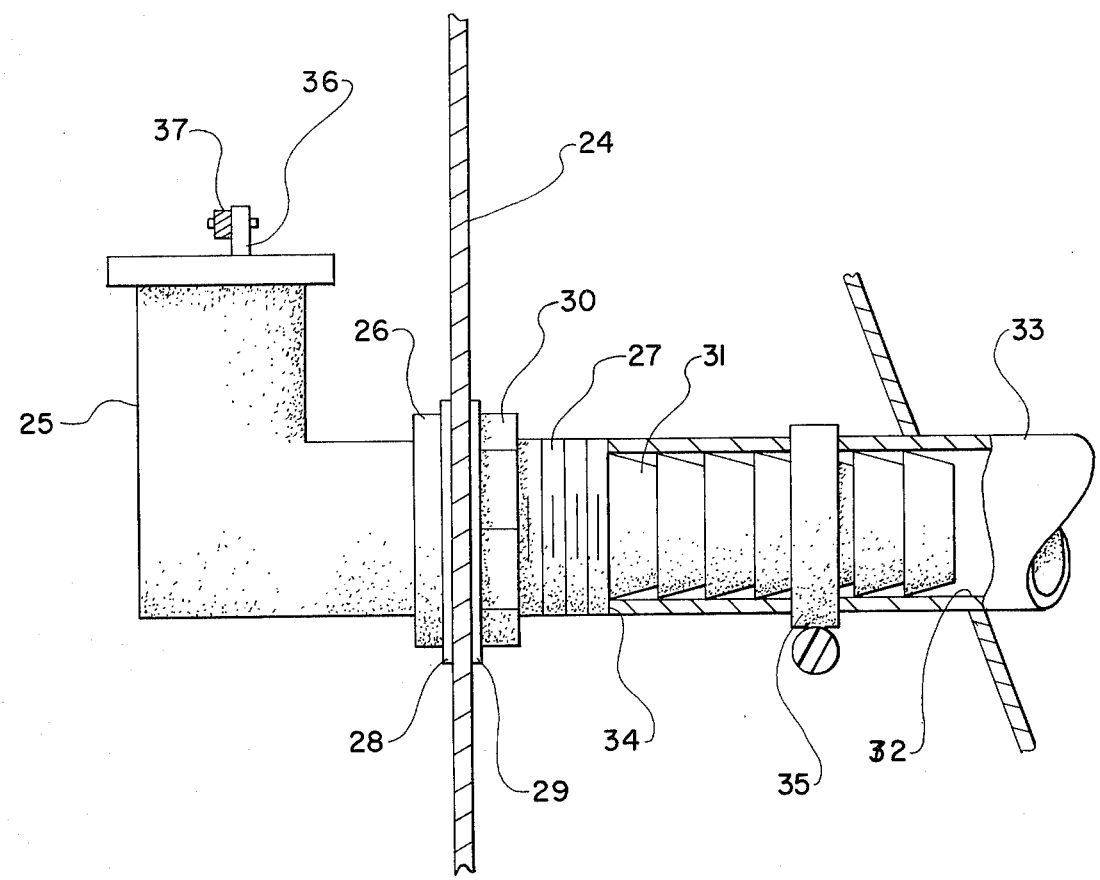
FIG. 4 is an enlarged sectional view of the hose connection portion of the present invention; and, FIG. 5 is a cross-section of the improved valve of the present invention.
Figure 5:
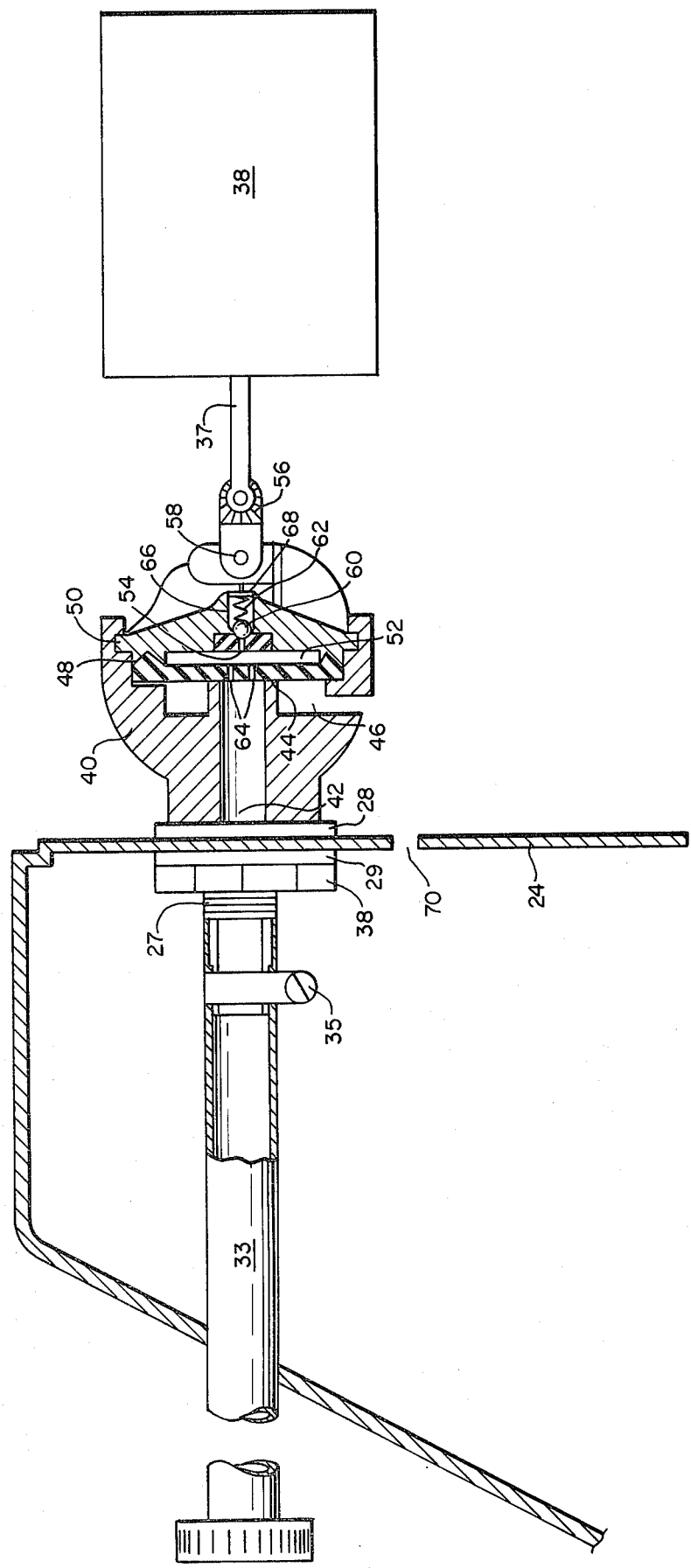

A float valve housing 25 is provided which is L-shaped and includes a collar 26 formed thereon with a threaded portion 27 extending outwardly therefrom as can clearly be seen in FIG. 4. While many float valve mechanisms may be used, the preferred valve is shown in FIG. 5 and is described below.

Another valve which works well is of the type manufactured by Fluidmaster, and is described in U.S. Pat. Nos. 3,429,333; 3,495,803; and 3,576,199. These valves must be modified by relocating the float shown in the patents, and by providing new inlet and outlet ports.

A washer 28 of rubber, neoprene or similar material is disposed between collar 26 and rear wall 24 of cavity 20 to form a liquid seal about the opening through said rear wall. A second rubber or neoprene washer 29 is adapted to lie juxtaposed to the exterior side of wall 24 and , of course, about the threaded portion 27 of housing 25.

A suitable nut 30 is threaded onto portion 27 to snugly engage washer 29 and to retain valve 25 in fixed position relative to cavity wall 24.

Outwardly extending from threaded portion 27 of valve housing 25 is a slightly tapered shank portion 31. This shank portion is so sized as to form a snug fit when inserted into the interior 32 of a commn garden hose 33. A shoulder 34 is provided between the threaded portion 27 and the shank portion 31 to abut the end of hose 33 as can clearly be seen in FIG. 4.

To retain hose 33 on shank portion 31 and to prevent accidental disconnection of such parts, a hose clamp 35 of normal configuration is provided.

Thus it can be seen that valve housing 25 is held in fixed relationship to cavity wall 24 by nut 30 with hose 33 being inserted onto shank portion 31 and held in place by clamp 35.

Valve actuator 36 is operatively connected to float arm 37 in the normal manner with the opposite end of float arm 37 mounting float 38.

FIG. 5 shows a novel valve which is useful particularly in the animal watering device described above. The valve is shown mounted in wall 24 of the animal watering device. Inlet hose 33, clamp 35, nut 30, and washers 28 and 29 are similar to that already described. The valve comprises a housing 40 having an inlet port 42. At the end of inlet port 42 is an annular valve seat 44. The inlet 42 communicates with an outlet 46, which discharges fluid into the container 13. A circular diaphragm 48 covers the seat 44. The valve body 40 and the valve cap 50 are preferably secured together by ears on the valve cap which are received within grooves in the valve body. The diaphragm 48 is secured at its perimeter between the valve body 40 and the valve cap 50.

Located between the bottom of the valve cap 50 and the diaphragm 48 is a pressure sealing chamber 52. A pressure relief hole 54 communicates with the pressure sealing chamber and the watering container 13. A float 38 is pivotally connected to the valve cap 50 by an arm 37 and an adjustable connection 56, and pivot 58. Connected to the arm 37 is a ball 60, connected to the arm 37 via a spring 62.

The valve operates as follows. When the float 38 is in a lower position, the ball 60 is displaced from the hole 54, and water in the chamber 52 is allowed to leak out of the hole 54. In this condition, the diaphragm 48 is not urged against the seat 44 and water passes from the inlet 42 over the seat and into the outlet 46, thus filling the watering chamber 13. When the float 38 rises to a predetermined level, which may be adjusted via the adjustable connection 56, the ball 60 is urged against the hole 54, thus sealing the pressure chamber 52. The diaphragm 48 has holes 64 which allow water pressure to build up in the chamber 52. When the water pressure in chamber 52 becomes large enough, the diaphragm 48 is urged against the seat 44 thus shutting off the flow of water between the inlet 42 and the outlet 46. This condition prevails until the float 38 falls releasing the ball 60 from the hole 54.

This valve is very efficient since the hole 54 can be small enough to require only a small force to be applied to the ball 60. This means that the float lever arm 37 can be very short since it is not the direct force on the lever arm which closes the valve. In the preferred embodiment, a spring urges a ball against the hole and is controlled by a wire attached to the float. The ball, and the spring are contained in a cylindrical guideway 66 which is closed at the end adjacent the float by a disc 68 having a hole therein for the allowing wire to pass through.

To use the watering means of the present invention, the reservoir container 10 is placed at the desired location so that the animal using the same can have access to the interior area 11. If necessary, the access cover 21 can be removed and adjustments in the float and float valve contained cavity 20 can be made. The access cover can then be replaced over such cavity. A standard garden hose 33 is inserted on shank portion 31 of valve 25 and held in place by hose clamp 35. Hose 33 passes through opening 23 of skirt 14 and is connected at its end opposite valve 25 to a source of water.

If container 10 is placed on the ground and it is desired to anchor the container, anchor legs 16 can be inserted into leg sockets 15 on the lower side of bottom 13, and conical tips 19 of such legs pushed into the ground. On the other hand, if the container 10 is used on a concrete area or other hard surface, then the legs would not be inserted into the sockets but the container would sit flat on the cement or other surface.

When water or other liquid is supplied to hose 33, float valve 25 will allow the liquid to rise within the reservoir 11 until float 38 cuts such valve off at a predetermined level. As the animal using the present invention drinks the water or other liquid, valve 25 will allow additional liquid to run into the reservoir thus maintaining a constant level without necessitating periodic checking by the attendant of the animal. Overflow hole 70 is provided so that if water pressure is lost, for example when water is supplied from a well, water in the bowl 10 will not siphon back into the well. The overflow hole is placed below the valve outlet. This prevents contamination of the well reservoir by the siphoning of dirty water from the bowl. It will also be appreciated that the anti-siphon hole 70 may be provided in the embodiment shown in FIG. 3.

From the above, it can be seen that the present invention has the advantage of providing a simple and inexpensive and yet highly efficient animal watering means which resists tipping, is adaptable for use on either hard or soft surfaces and includes insertable anchors for securing the same in place. Further the valve and hose connections are simple and yet highly efficient and are also compatible with domestic water supplies.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

It is claimed:

1. An animal watering means comprising: a reservoir container having interior wall and bottom portions forming a liquid containing reservoir, and an outer wall, downwardly and outwardly flared from the upper portion of said interior wall portion, to form a stabilizing skirt; said outer wall having a perimeter which lies in a plane spaced from said bottom portion, a valve cavity formed in an area of said wall portion; a float valve means operatively mounted within said valve cavity; hose means passing through said stabilizing skirt and operatively connected within said skirt at one end to said valve means and its other end adapted to be connected to a liquid supply; and socket means fixed to said bottom portion for removably receiving anchoring means, said socket means having a predetermined thickness equal to the spacing between said bottom and said plane containing said perimeter so that the bottom of said anchoring means lies in said plane, whereby an improved, anchorable, constant level animal watering system is provided.

2. The animal watering means of claim 1 wherein a removable access cover is provided over said valve cavity.

3. The animal watering means of claim 2 wherein said access cover includes a liquid permeable area.

4. The animal watering means of claim 3 wherein said liquid permeable area is a scalloped shape configuration in the lower portion of said cover.

5. The animal watering system of claim 1 wherein said reservoir container is integrally formed.

6. The animal watering system of claim 5 wherein said integrally formed reservoir container is molded from a thermoplastic material.

7. The animal watering system of claim 1 further comprising anchoring means having one end adapted to be received in said socket means, and having a major portion which is conical.

8. Animal watering means in accordance with claim 1 wherein said valve means comprises
a valve seat for controlling flow of liquid,
an inlet port for supplying liquid to said valve seat,
an outlet port for allowing egress of liquid from said valve seat,
a diaphragm covering said valve seat for controlling flow of liquid from said inlet to said outlet,
means for forming a pressure sealing chamber for urging said diaphragm against said seat,
means for admitting liquid from said inlet port to said pressure sealing chamber,
relief means for allowing liquid to escape from said pressure sealing chamber,
stop means for preventing liquid from escaping through said relief means,
elastic means located in an elongate guideway for causing said stop means to engage said relief means, whereby said diaphragm will be urged against said seat when flow through said relief means is prevented by engagement of said stop means with said relief means.

* * * * *